United States Patent
Huberman et al.

(10) Patent No.: US 6,834,811 B1
(45) Date of Patent: Dec. 28, 2004

(54) MARKET-BASED TEMPERATURE CONTROL SYSTEM AND METHOD

(75) Inventors: Bernardo Huberman, Palo Alto, CA (US); Scott Clearwater, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/405,307

(22) Filed: Apr. 1, 2003

(51) Int. Cl.[7] .................................................. F24F 7/00
(52) U.S. Cl. ..................... 236/49.3; 62/178; 62/259.2; 705/37
(58) Field of Search ................... 236/49.3; 62/259.2, 62/178, 180; 705/37

(56) References Cited

U.S. PATENT DOCUMENTS

| | | | | |
|---|---|---|---|---|
| 4,217,646 A | * | 8/1980 | Caltagirone et al. | 700/296 |
| 4,661,914 A | * | 4/1987 | Mulokey et al. | 700/296 |
| 5,394,324 A | | 2/1995 | Clearwater | |
| 5,924,486 A | * | 7/1999 | Ehlers et al. | 165/238 |
| 6,115,698 A | * | 9/2000 | Tuck et al. | 705/37 |
| 6,119,052 A | | 9/2000 | Guenther et al. | |
| 6,216,956 B1 | * | 4/2001 | Ehlers et al. | 236/47 |
| 2003/0158632 A1 | * | 8/2003 | Nierlich et al. | 700/295 |
| 2004/0020225 A1 | * | 2/2004 | Patel et al. | 62/229 |

FOREIGN PATENT DOCUMENTS

JP 356066639 A * 6/1981 ............ F24F/11/02

* cited by examiner

Primary Examiner—Marc Norman

(57) ABSTRACT

A temperature control system and method uses a market-based approach to control the temperature of regions within an unpartitioned space, such as a computer data center. Market agents may be associated with regions of the data center that may contain one or more heat-generating processor racks. Prices for the thermal resources may be established. The market agents may generate bids for thermal resources to be delivered to the respective regions. The bids may be based in part on differences between the measured temperatures and the target temperatures of the regions. Sets of the market agents are assigned to control of sets of thermal resources. Delivery of the thermal resources to the regions is controlled by the market agents.

56 Claims, 6 Drawing Sheets

MARKET-BASED TEMPERATURE CONTROL SYSTEM AND METHOD

FIELD OF THE INVENTION

The present disclosure generally relates to market-based temperature control in data centers.

BACKGROUND

Environmental control for computer data centers presents unique challenges. Data centers are typically configured as open spaces containing a number of heat generating processor racks. Conditioned air is typically produced by a central computer room air conditioning unit and supplied to the data center through floor vents.

Temperature control for data centers is complex because chilled air from the air conditioning system mixes freely with heated air from the processor racks. Consequently, it is not always clear what control action will lead to a particular outcome. For example, opening a floor vent to supply more air may decrease the temperature at a processor rack close to the floor vent. However, processor racks at a distance from the adjusted floor vent may experience desirable or undesirable temperature effects.

In theory, a central control system with access to all the parameters affecting the temperature of the data center could optimally control the temperature of all processor racks within the data center. In practice, however, a perfect model of the system is not possible. The present invention may address these and other issues relating to temperature control of data centers.

SUMMARY OF THE INVENTION

The present disclosure describes a market-based method and apparatus for temperature control of processor racks arranged within an open space such as a computer data center. In accordance with embodiments of the invention, a method for temperature control of a data center involves associating market agents with regions in the data center. Prices are established for thermal resources available in the data center. The market agents generate bids for the thermal resources. Sets of the market agents are assigned to control sets of the thermal resources based on the bids. The thermal resources controlled, in part, by the market agents are delivered to the regions.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
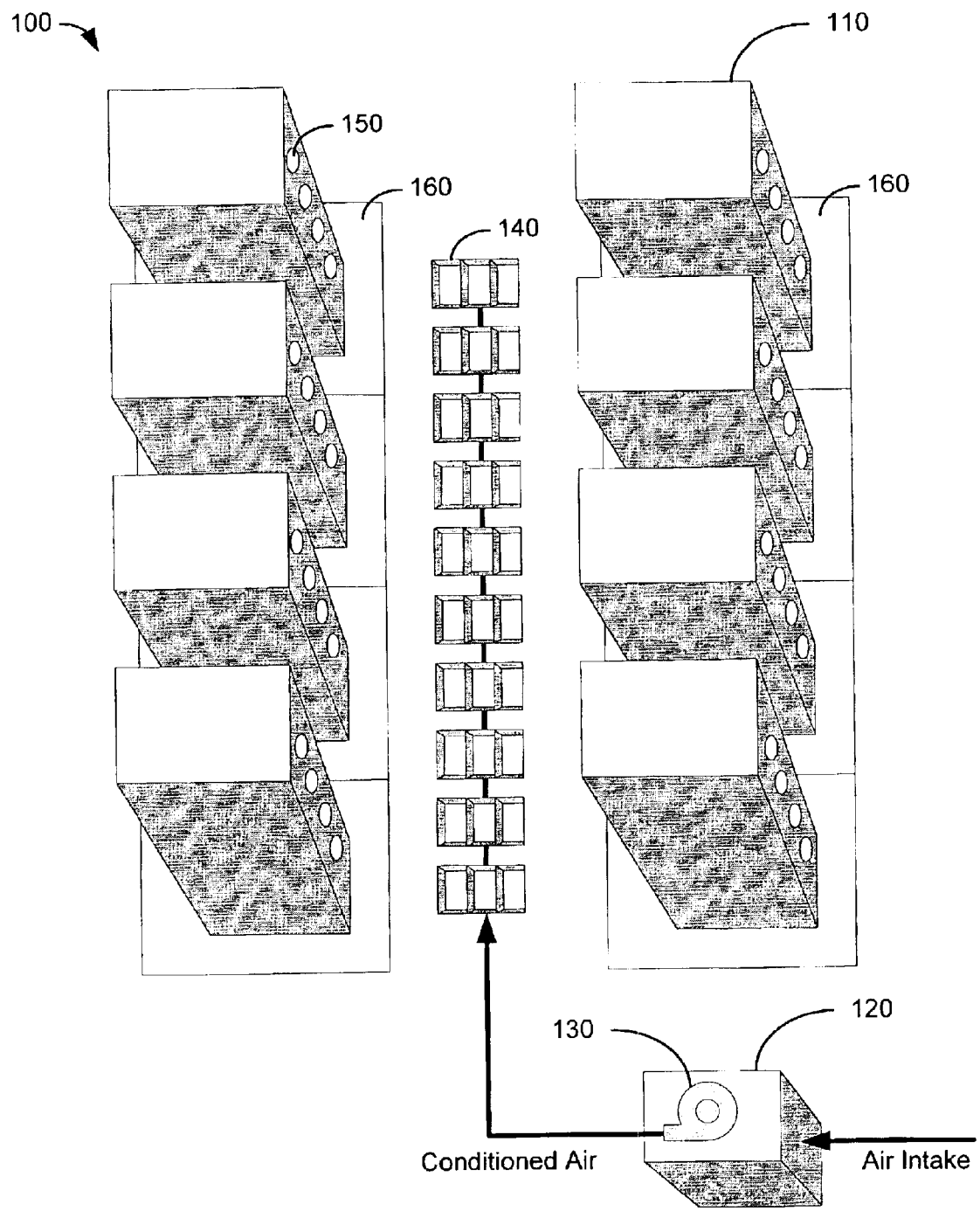
FIG. 1 is a diagram of an air conditioning system for implementing the market-based temperature control system according to various embodiments of the present invention.

The present disclosure describes a system and method for market-based temperature control of a room, or other open space, enclosing a number of heat generating devices. Various configurations detailed herein have been found to be an effective methodology for distributing cooling resources to processor racks in a computer room or data center, for example. Further, the invention is thought to be particularly efficient at reducing the amount of energy required to maintain the temperature of processor racks in a data center within a desirable operating range.

The embodiments discussed herein involve a market-based system and method for temperature control. Regions within the data center are associated with market agents used to control the temperature of the regions. According to various embodiments, each region may contain one or more heat-generating processor racks requiring cooling resources. Each region may be defined so that the region encloses a single rack. In this situation, an independent market agent is associated with each of the processor racks in the data center. Alternatively, a region may be defined so that it encloses a group of racks within the data center. For example, a region may be defined so that it encloses an entire row of racks. In this situation, the row of racks would be associated with a single market agent.

The market-agents bid for the opportunity to control one or more thermal resources available to their respective regions. The thermal resources available to cool the processor racks may include, for example, air temperature, air flow rate, or air flow direction. The regions associated with the market agents may be considered "consumers" of the cooling resources. The computer room air conditioning unit, fan, and directional air vents may be considered "producers" of the cooling resources.

A market agent may submit a buy bid if the measured temperature of the associated region is higher than its target temperature. A buy bid represents a request for an increase in the amount of cooling resources allocated to the region. If the measured temperature of the region is below its target temperature, the market agent may submit a sell bid representing an offer to sell. A sell bid represents an offer by the market agent to reduce its allocation of thermal resources. According to embodiments described below, the highest bidding market-agent is the market agent presenting the highest buy bid to increase its allocation thermal resources. The highest-bidding market agent gains the opportunity to control one or more of the thermal resources, categorized herein into sets of primary and secondary resources.

Primary resources are those that affect a majority of regions within the data center. A change in the level of a primary thermal resource influences the temperature of most or all of the regions in the data center. For example, changing the air temperature and/or air flow velocity of a central air conditioning unit of the data center is likely to affect most or all regions within the data center.

Another set of thermal resources, denoted herein as secondary thermal resources, may have little influence on the temperature of regions outside a localized area. Secondary thermal resources affect a minority of the regions in the data center. For example, local air flow direction may be considered a secondary thermal resource. A data center may have multiple air vents or tiles for directing the air flow. Adjustment of one of the air vents predominately affects regions in the immediate vicinity of the air vent. The effect of the adjustment may have little effect on the temperature of regions far from the air vent.

One challenge presented by temperature control of a data center is to ensure that thermal resources allocated to a region are actually delivered to the region. This challenge arises because data centers are typically arranged as unpartitioned spaces in which chilled air from the computer room air conditioning (CRAC) unit circulates and mixes freely with heated air from the processor racks. Because there is generally little ductwork in a data center, the ability to deliver cool air to a particular region is highly dependent on the fluid dynamics of the room. Consequently, it is not always clear what control action, e.g., decreasing air flow rate or changing air flow direction, will lead to a particular outcome. For example, because of the nonlinear dynamics of the data center, opening a floor tile to deliver more air may increase or decrease the temperature at the nearest processor rack. Increasing fan speed might seem to be beneficial for cooling, but if the air simply blows over the top of the racks, then an increase in the resource does not decrease the temperature of the region.

FIG. 1 illustrates an example layout of a utility data center. The example data center provided herein is representative of components that may used in a data center controlled by a market-based system in accordance with principles of the invention. It will be appreciated that there are many possible configurations for the physical layout of a data center and for the air conditioning system used to maintain the temperature of the data center. The market-based temperature control system methodology described herein is not limited to the specific example layout and air conditioning system described for illustrative purposes herein, and may be used for temperature control of wide variety of data center layout and air conditioning configurations.

The example utility data center 100 houses eight processor racks 110 arranged in two parallel rows of four racks. The data center 100 is cooled by a computer room air conditioning unit (CRAC) 120 that produces temperature-conditioned air for the computer room. Because the processor racks generally produce a considerable amount of heat, the CRAC 120 may be primarily used to provide cool air to the data center 100. Alternatively, or additionally, the CRAC may provide warm air. The air temperature produced by the CRAC 120 may be varied to maintain the data center and the processor racks within desirable operating limits.

A fan 130 coupled to the CRAC 120 is capable of generating an adjustable air flow rate of conditioned air produced by the CRAC 120. The fan 130 output may be coupled to a plenum located, for example, beneath the access floor of the data center 100. The plenum carries the conditioned air to the vicinity of the processor racks 110.

A number of adjustable air vents or tiles 140 are coupled to the plenum and may be used to direct the air flow supplied by the plenum towards or away from the processor racks in the vicinity of the air vents. The tiles 140 may also be adjusted to increase or decrease the amount of air exiting the tiles.

The example data center is divided into eight regions 160. In this example, each region 160 includes a single processor rack 110. Although in this example there is 1:1 correspondence between the regions and processor racks, other configurations are possible. For example, the regions may be defined to include an entire row of processor racks. Further, it may be beneficial to orient all or a portion of the regions perpendicularly with respect to the data center floor, so that lower, middle and upper regions are defined.

The processor racks 110 may include one or more thermometers 150 located at various locations within the processor racks 110. In one embodiment, four thermometers 150 are located at varying heights within each of the processor racks 110. In other examples, each processor rack 110 may have only one thermometer 150 located near the top of the rack 110, or where the air temperature is expected to be highest. The thermometers need not be located within the processor racks, but may be located anywhere within the regions 160.

Figure 2:
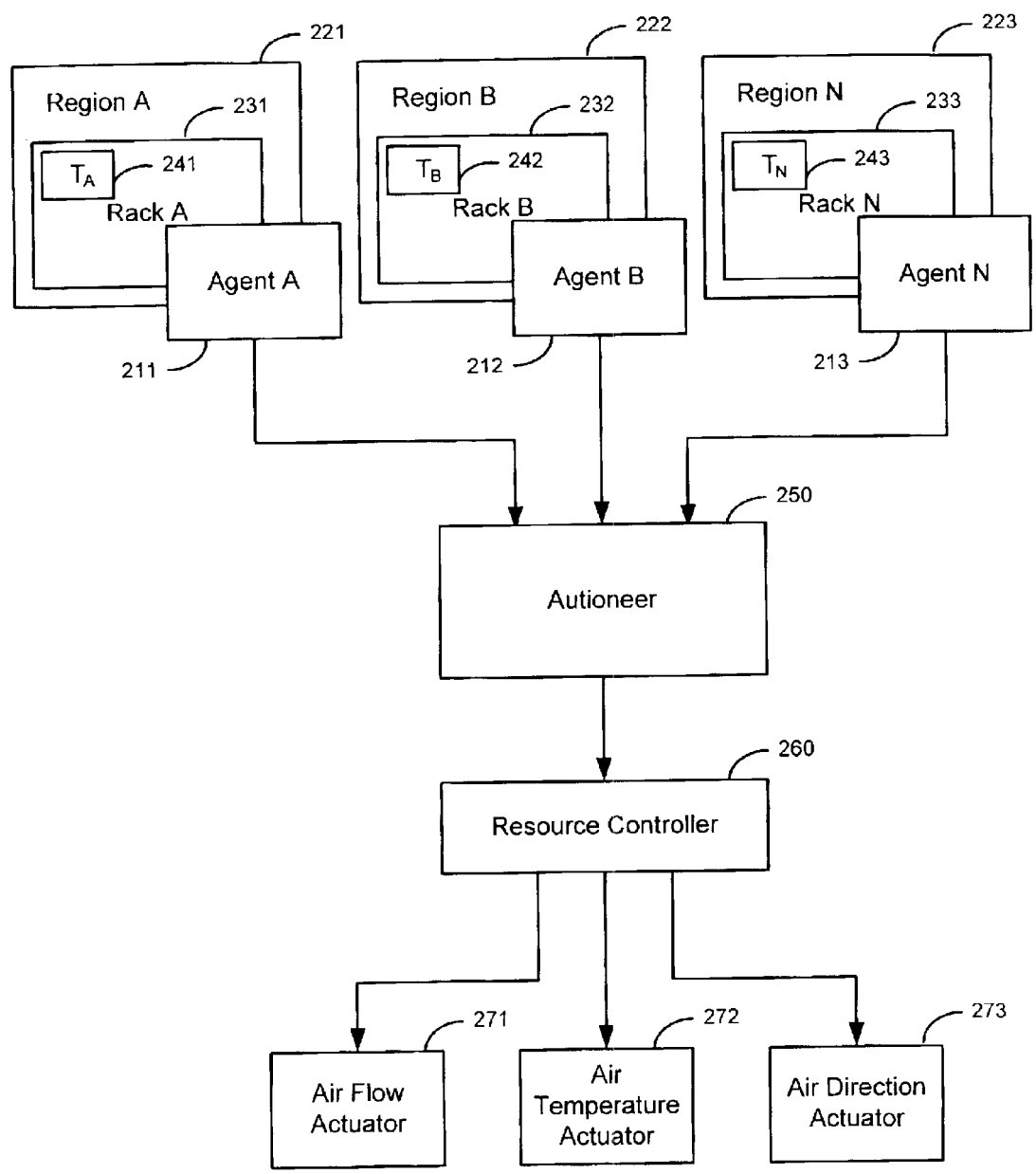
FIG. 2 is a block diagram illustrating components of a market-based control system arranged in accordance with embodiments of the invention.

The block diagram of FIG. 2 illustrates a representative set of components for implementing a market-based system 200 used for temperature control of a data center in accordance with various embodiments of the invention. Although FIG. 2 illustrates components associated with three regions of a data center, and three thermal resources are controlled, the data center may be divided into more or fewer regions and may involve more or fewer thermal resources to implement the temperature control methodology according to embodiments of the invention. Further, although the block diagram of FIG. 2 illustrates a single rack located within a particular region, a region may contain any number of racks or no racks. For example, the system may be configured so that a row of processor racks is located within a region associated with a particular market agent.

As illustrated in FIG. 2, market agents 211, 212, 213 are associated with regions 221, 222, 223 of a data center. The regions 221, 222, 223 may include one or more processor racks 231, 232, 233 located within the regions 221, 222, 223. The regions 221, 222, 223 of the data center may also include a number of thermometers 241, 242, 243 for measuring the temperature of the regions 221, 222, 223. The thermometers 241, 242, 243 may be located on the processor racks 231, 232, 233, or at other suitable locations within the regions 221, 222, 223 and are coupled to the market agents 211, 212, 213.

The market agents 211, 212, 213 are coupled to an auctioneer 250 that establishes a price for the thermal resources and accepts bids from the market agents 211, 212, 213 during bidding rounds. Prior to a bidding round, the auctioneer may allocate wealth to the market agents 211, 212, 213 to be used during the bidding round. In one implementation, an equal amount of wealth is allocated to each market agent 211, 212, 213. In another implementation, more wealth is allocated to the market agents assigned to regions where it is more difficult to control the temperature. For example, regions located near the edges of the data center, where air mixing is at a maximum, may be found to be the most difficult to control. Thus, more wealth may be allocated to these "trouble spots" to provide them with more of an opportunity to make changes in the thermal resource settings.

Market agents 211, 212, 213 generate bids to increase or decrease the amount of thermal resources delivered to the regions 221, 222, 223. For example, if the measured temperature of a particular region, e.g., region A 221, is higher than a target temperature, the market agent associated with the region, in this example, agent A 211, generates a buy bid indicating that an increase in the amount of cooling resource is desired. The amount of the buy hid is a function of the difference in temperature and the agent's wealth. If the measured temperature of a particular region 221, 222, 223 is below the target temperature, the market agent 211, 212, 213 associated with the region 221, 222, 223 may generate an offer to sell, indicating that too much cooling resources are being delivered to the region. An offer to sell represents a request for a decrease in the amount of cooling resources delivered to the region 221, 222, 223.

The auctioneer 250 allocates the thermal resources based on the bids of the market agents 211, 212, 213. According to the resource allocation, the auctioneer 250 sends appropriate control signals to a delivery system including a resource controller 260 coupled to resource actuators 271, 272, 273 for each of the thermal resources. The resource controller 260 controls the resource actuators 271, 272, 273 to deliver the allocated thermal resources to the regions 221, 222, 223.

Figure 3:
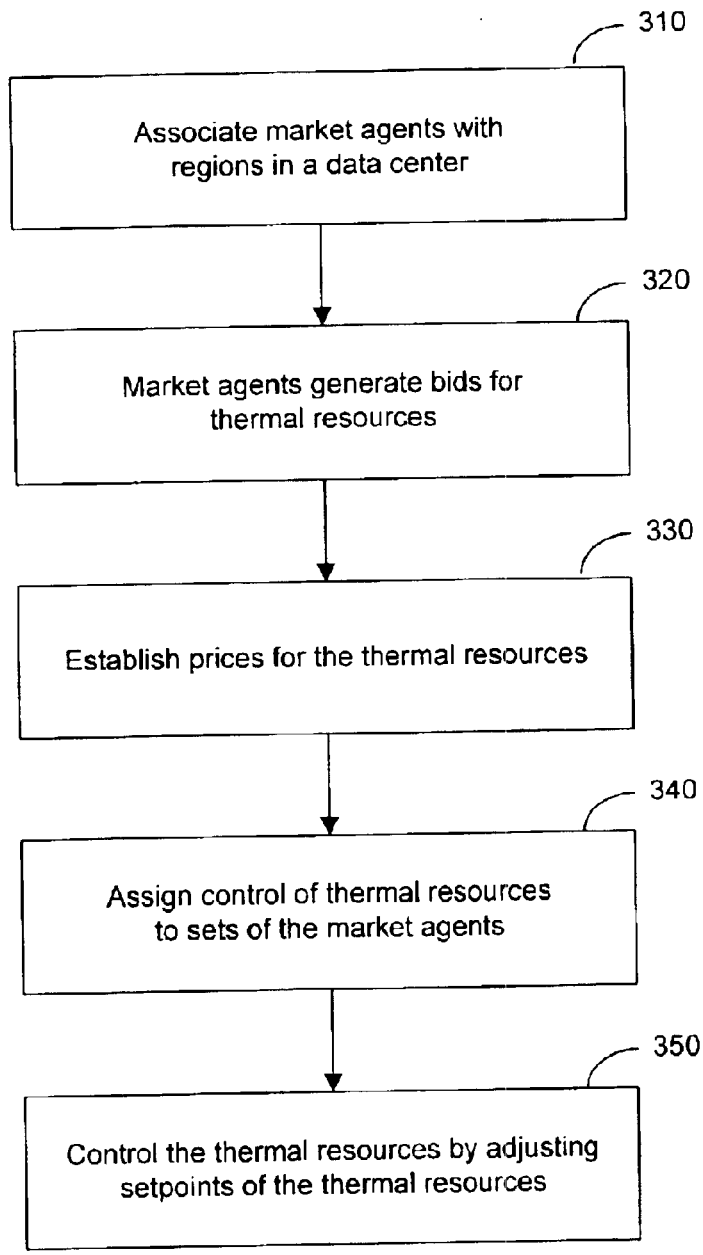
FIG. 3 is a flowchart illustrating a market-based method of temperature control in accordance with embodiments of the invention.

FIG. 3 is a flowchart illustrating a market-based temperature control method in accordance with embodiments of the invention. A number of market agents are associated 310 with regions in a data center. One or more equipment racks may be located within each of the regions. The market agents submit bids 320 requesting an allocation of thermal resources to be delivered to the respective regions associated with the market agents. For example, a market agent may submit a buy bid for more cooling resources if the measured temperature of the region associated with the market agent is higher than a target temperature. Conversely, the market agent may submit an offer to sell if the temperature of the region is below the target.

Figure 6:
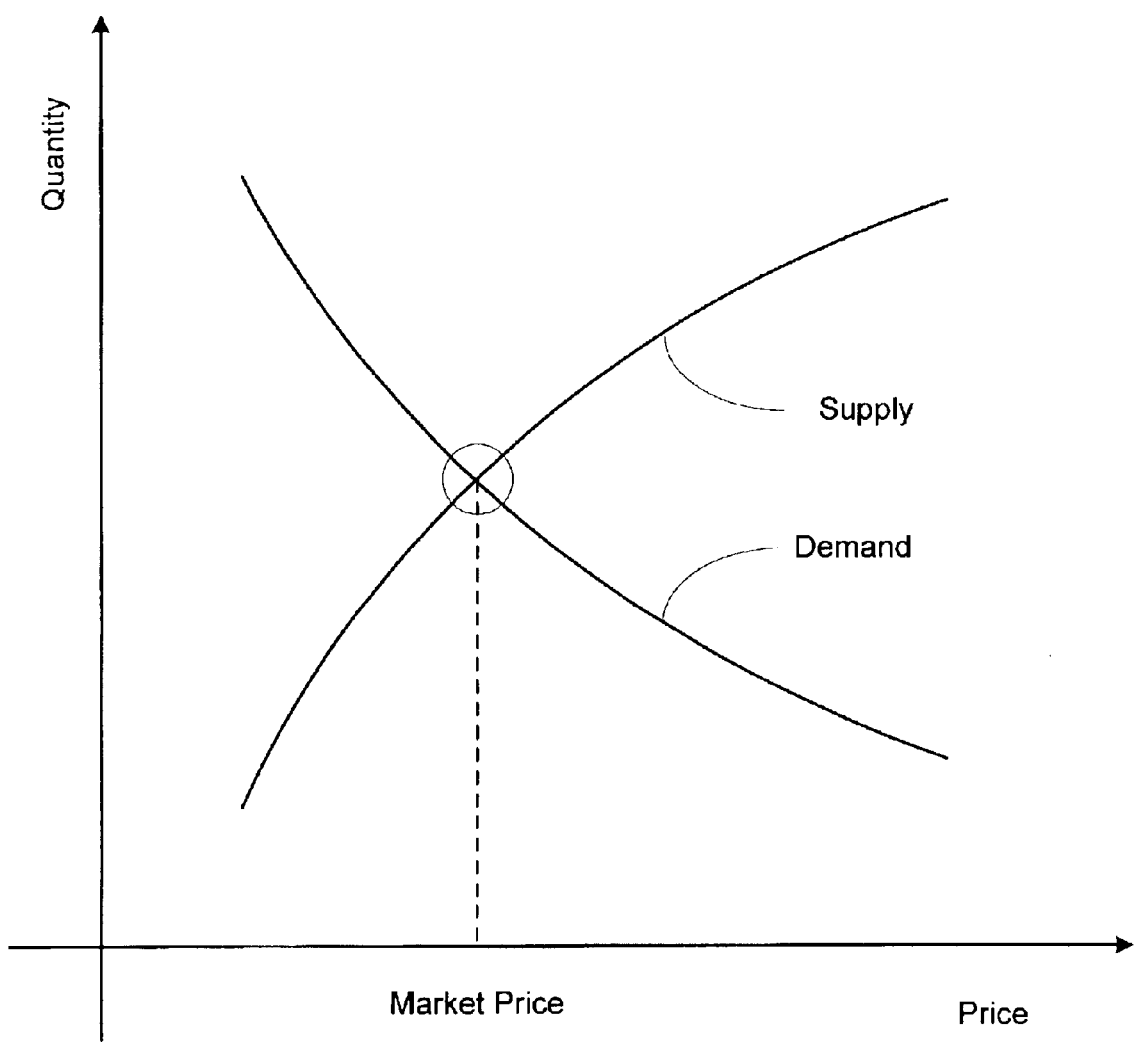
FIG. 6 is a graph of quantity supply and demand functions utilized to determine a market price in accordance with embodiments of the invention.

Prices for each of the thermal resources are established 330. The prices may be established, for example, using known information about the actual cost of the thermal resources provided. In this scenario, the prices may be communicated to the market agents prior to the bidding stage. The market agents then submit bids for an amount of thermal resources at the established price as a function of the difference between the measured temperatures and the target temperatures of the respective regions as well as the wealth of the market agent. Alternatively, market prices for the thermal resources may be determined based on the bids submitted by the market agents during an auction. In this implementation, the agents may submit a collection of buy bids or offers to sell, e.g., quantity$_1$ at price$_1$, quantity$_2$ at price$_2$, quantity$_3$ at price$_3$, etc. As illustrated in FIG. 6, an equilibrium market price may be determined by calculating a resource quantity supply function and a resource quantity demand function based on the buy and sell bids of the market agents. The market price is then established as the point at which the supply and demand functions are substantially equal.

Turning back to the flowchart of FIG. 3, control of the thermal resources is assigned 340 to the market agents based on the bids. A first set of market agents, representing one or more of the highest bidding market agents, "wins" the ability to control the most critical thermal resources, denoted herein as primary thermal resources. Control of secondary and tertiary, etc., thermal resources may be assigned to additional sets of market agents based on the amount of their bids.

The delivery of the thermal resources is controlled 350 according to the bids submitted by the market agents. New setpoints for the primary thermal resources are determined from the bids of the highest bidding agents. An optional optimization procedure may be used in conjunction with the setpoint adjustment of the primary thermal resources. Additional sets of the thermal resources, e.g., secondary and tertiary thermal resources, are controlled based on the bids of additional sets of market agents. The thermal resources are delivered to the regions.

Figure 4:
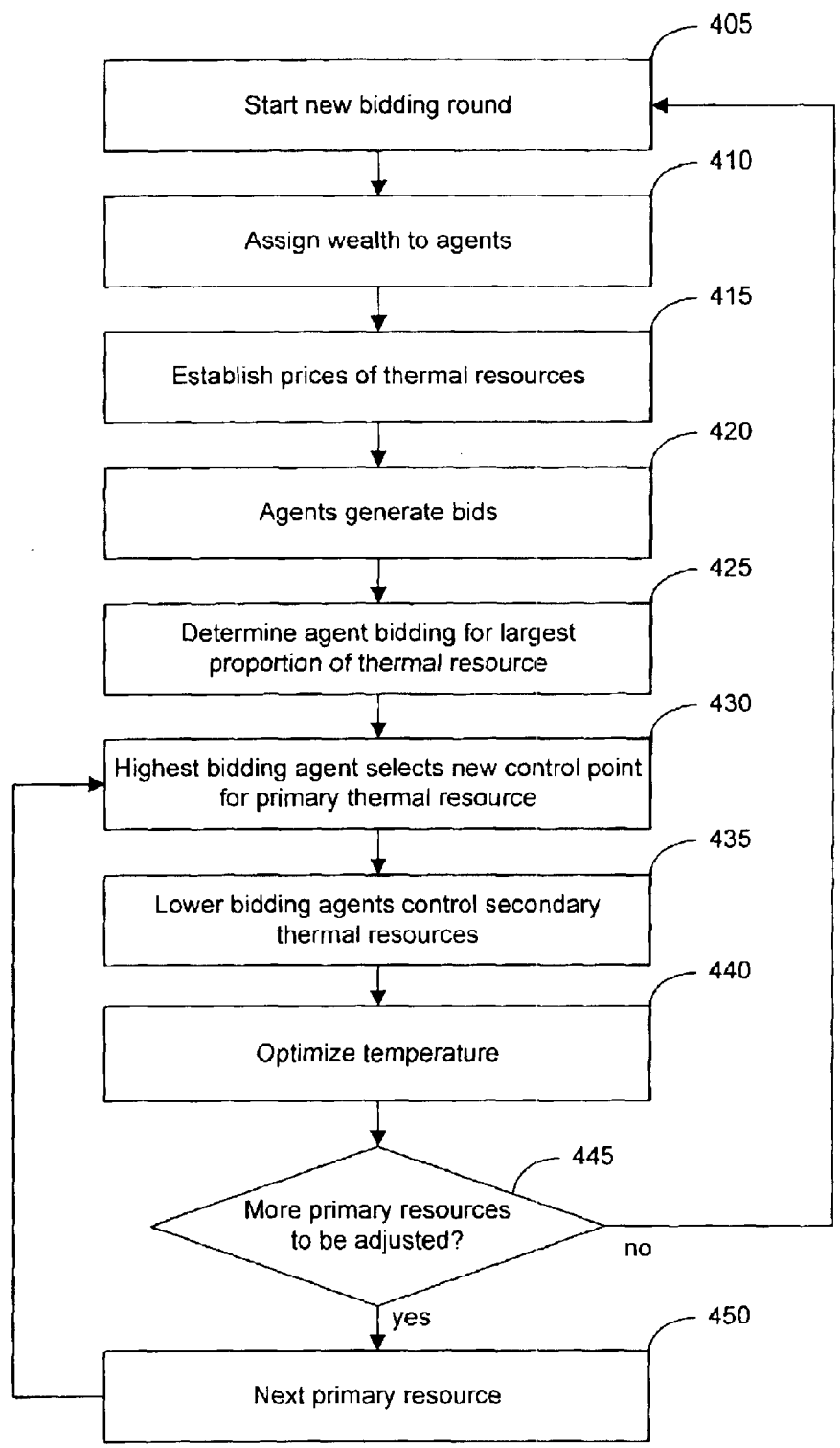
FIG. 4 is a flowchart illustrating temperature optimization using a market-based temperature control method according to various embodiments of the invention.

FIG. 4 is a flowchart illustrating an example market-based temperature control method in accordance with embodiments of the invention. In this example, the market-based control system assigns control of two sets of thermal resources. Primary resources in this example include conditioned air temperature and air velocity. Air flow direction is considered a secondary resource. Control of the primary thermal resources is assigned to the highest bidding market agent. Control of the secondary thermal resource is assigned to all of the market agents, including the highest bidder.

Upon starting a new bidding round 405, each market agent is allocated 410 an amount of "wealth" to be used for the bidding. In one implementation, the market agents are allocated an equal amount of wealth for each bidding round. In another implementation, wealth may be allocated to the market agents based on the relative difficulty of temperature control for the regions associated with the market agents. The wealth does not necessarily represent real money, but the agents treat it as such. Whatever wealth is not used during a particular bidding round disappears.

Prices of the thermal resources are established 415 based on actual costs of the thermal resources. Accordingly, decreasing the conditioned air temperature is the most expensive thermal resource, followed by increasing the air velocity. Adjusting a floor tile is associated with a minimal or zero cost.

Each market agent constructs a bid 420 for thermal resources based on its wealth, the cost of the thermal resource, and the difference between the measured temperature of the associated region and the target temperature. Additionally, each market agent may take into account the average temperature of nearby regions in constructing its bid. For example, the $i^{th}$ market agent, agents, may generate the following bid:

$$\text{Bid}(\text{agent}_i) = \alpha(T_i - \text{avg.}(T_{nearby})), \quad [1]$$

where $\alpha$ is a function of the market agent's wealth.

The highest bidding market agent is determined 425. Only the highest bidding agent, typically representing the region that is farthest away from its target temperature, is assigned control of the primary thermal resources, air temperature and air velocity.

The highest bidding agent selects one of its possible resources, i.e., air temperature, air velocity, and air direction to control. The particular thermal resource selected for adjustment may be based on the cost of the resource. As previously discussed, decreasing the air temperature and/or increasing the air velocity are most expensive because they require an increase the amount of energy entering the system. Adjusting a tile involves minimal or no cost because tile adjustment does not change the energy entering the system, but only its distribution. According to this pricing structure, the tiles are likely to be adjusted first, the air velocity exiting the CRAC next, and, finally, the air temperature.

Specifically, on a given round of bidding, the highest bidding agent chooses probabilistically whether to adjust a tile, the air velocity, or the air temperature. In one implementation, the probability that a tile is changed is 1−1/numtiles, where numtiles is the number of floor tiles, for example, numtiles equals 10 for the example system illustrated in FIG. 1. With probability 1/numtiles, the CRAC air velocity or the CRAC air temperature is changed. The probability of adjusting the CRAC air velocity is based on the current power use of the fan, represented by fanpower. The power use of the CRAC for controlling air temperature is represented by CRACpower. The probability the fan is changed is 1−fanower/(fanpower+CRACpower). Fanpower is approximately equal to 1/10 CRACpower, thus, the CRAC air temperature is only changed about 10% of the time. In other words, the CRAC air temperature is the last thermal resource to be adjusted because of its cost.

After selecting the thermal resource to be adjusted, the highest bidding market agent chooses a new setpoint for the selected thermal resource based on its utility function. The following utility function is an example function that can be used to adjust the selected thermal resource:

$$\text{Utility} = A*\text{Max}(0, T-T_{target}) + B*\text{power}(\text{fan}, CRAC)/\text{power}(100\%, CRACmin),$$

where $T_{target}$ is the target temperature, power(fan, CRAC) is the amount of power being used based on the fraction of maximum fan flow, CRACmin is the minimum CRAC outlet temperature. In this utility function example, A and B are weights to give different emphasis to either the target temperature or power, depending on the particular application. In one implementation, A and B may be set equal to one.

After the highest bidding agent adjusts the selected primary resource, the lower bidding agents adjust 435 the secondary resources. In this example implementation, the lower bidding agents can only change the air direction by adjusting the floor tiles.

A number of iterations are performed to optimize 440 the effect of the change in the selected primary resource. The iterations include the highest bidding agent selecting a new setpoint for the primary resource and all the agents adjusting the air direction from the floor tiles. After the first thermal resource selected by the highest bidding agent is adjusted and optimized, the highest bidding agent selects for adjustment 450 the next thermal resource it is assigned to control. The highest bidding agent selects 430 a new setpoint for the next primary resource and optimization proceeds as previously discussed. This process continues until all the primary thermal resources 445 assigned to the highest bidding agent have been optimized. After all the thermal resources have been optimized 445, the next bidding round begins 405.

Figure 5:
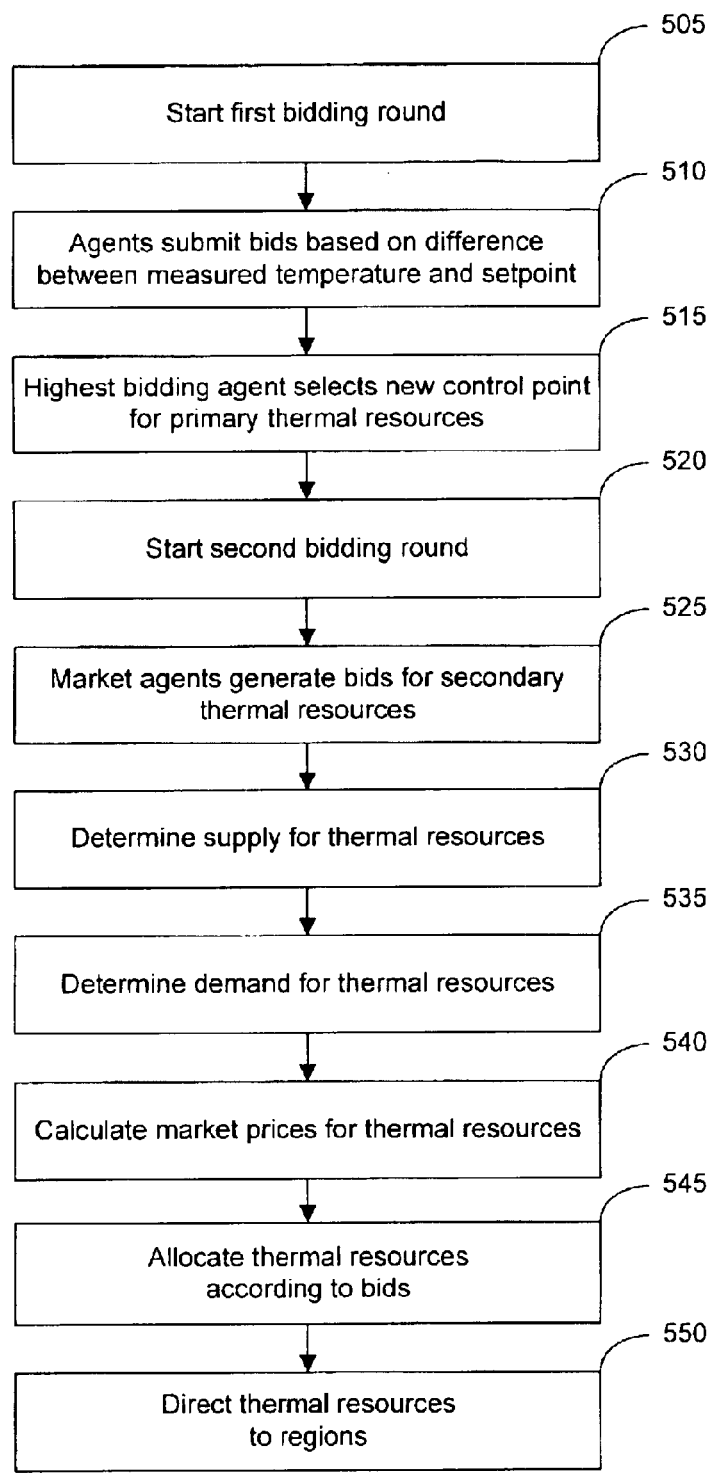
FIG. 5 is a flowchart illustrating a method of conducting an auction for thermal resources in accordance with embodiments of the invention.

The flowchart of FIG. 5 illustrates another example method of market-based temperature control in accordance with embodiments of the invention. In this example the primary thermal resources, e.g., air temperature and fan speed, are controlled by the highest bidding agent in a first bidding round. Tile adjustment is accomplished using an auction approach that is accomplished in a second bidding round.

According to a first implementation, prior to the start a new bidding round 505, each market agent is allocated an amount of wealth to be used for the bidding. The market agents may be allocated an equal amount of wealth for each bidding round. Alternatively, wealth may be allocated to the market agents based on the relative difficulty of temperature control for the regions associated with the market agents. The allocated wealth does not necessarily represent real money and wealth is not used during a particular bidding round disappears. In addition, prior to the start of the first bidding round, the cost of controlling the primary thermal resources is established.

During the first bidding round, each market agent bids 510 for control of the primary thermal resources. The bids may be based on the cost of the thermal resources, the wealth of the agents, and the difference between the measured temperature and target temperatures of the respective regions. In a simplified configuration, only the temperature difference is considered, and the market agent having the largest difference between the measured temperature of the region and the target temperature of the regions "wins" the ability to control the primary thermal resources, i.e., air temperature and fan speed. The highest bidding agent then selects 515 a new setpoint for the air temperature and/or fan speed so that the measured temperature and the target temperature of the region are substantially equal.

In a second bidding phase 520, each market agent participates in a double blind auction for control of the secondary thermal resources. In this example, each of the market agents bids 525 for control of the nearby floor tiles that direct the conditioned air into the region. The tiles may be adjusted to deliver more or less air to the regions associated with the market agents. If a market agent "wins" the ability to adjust the tile with a high bid, the market agent is able to direct more cooling air into the region associated with the market agent, and thus maintain the region temperature within the target temperature range. This scenario represents a zero sum game, wherein if one region gains an amount of the conditioned air, other regions lose an equivalent amount.

Each of the market agents is allocated an amount of wealth before the second bidding round. After bidding, the allocated wealth disappears. This "burning" of wealth after a bidding round prevents runaway inflation in the bidding price. In one example, the amount of wealth an agent is allotted to bid may range from 100 units when the tile is fully open to 200 units when the tile is fully closed. The reason for the agent having some wealth when its tile is fully open, even though it cannot open further, is that the agent can still pay a neighboring agent to close its tile further, so that the agent associated with the fully open tile can still get more cool air. Dribbling wealth to the agents for each bidding round prevents them from bidding a day's worth of money on the first auction and having nothing left for the rest of the day.

In a double-blind auction, none of the potential buyers of sellers knows the value of any bid except its own. A bid may comprise, for example, a quantity (in this case in thermal units) to be traded at a given price. A buy bid represents an agent's willingness to buy a certain quantity of the thermal resources at or below its buy bid. An offer to sell represents an agent's willingness to forego a certain quantity of the thermal resources at or above its sell bid.

The auctioneer collects the bids and determines an equilibrium market price based on the buy bids and the sell bids. The auctioneer determines a resource supply 530 function using the offers to sell and a resource demand function 535 using the buy bids. The resource supply and demand functions are illustrated by the graphs of FIG. 6. The equilibrium market price is then established 540 as the price where the supply function is substantially equal to the demand function, as illustrated in FIG. 6. All agents whose offers to sell are at or below the auction price and all agents whose buy bids are at or above the market price will have their trades consummated. The thermal resources are then allocated 545 according to the consummated trades, allowing the successful market agents to adjust the tiles to provide more or less cooling air to be directed 550 into their respective regions. The bidding rounds described in connection with the above examples are conducted throughout the day at suitable intervals, for example, every minute.

A market-based temperature control system and method is described above in terms of several representative embodiments. The market-based control system may be implemented in software as an application operating on a central processor, wherein the market agent functions are procedures of the centralized application. Alternatively, the market agent functions may be distributed applications, running on individual processors located on or near the areas for which temperature control is provided.

In addition to the example embodiments described above, other aspects and embodiments of the present invention will be apparent to those skilled in the art from consideration of the specification and practice of the invention disclosed herein. It is intended that the specification and illustrated embodiments be considered as examples only. Various alternatives, modifications, and variations may be made by those skilled in the art within a true scope of the invention as indicated by the following claims.

What is claimed is:

1. A method for temperature control, comprising:
    associating market agents with regions of an area;
    generating bids for thermal resources available in the regions using the market agents;
    assigning a first set of market agents to control primary thermal resources, the primary thermal resources affecting a majority of the regions;
    assigning a second set of market agents to control secondary thermal resources, the secondary thermal resources affecting a minority of the regions; and
    controlling the delivery of the thermal resources to the regions using the sets of market agents.

2. The method of claim 1, wherein assigning the first set of market agents comprises assigning the first set of market agents to control air temperature and air velocity.

3. The method of claim 1, wherein assigning the second set of market agents comprises assigning the second set of market agents to control air flow direction.

4. The method of claim 1, wherein generating the bids for the thermal resources comprises:
    determining temperatures of the regions;
    comparing the region temperatures with target temperatures; and
    generating the bids based in part on differences between the region temperatures and the target temperatures.

5. The method of claim 4, wherein determining the temperature of a particular region comprises determining temperatures of one or more locations within the particular region.

6. The method of claim 4, wherein determining the temperature of a particular region comprises determining an average temperature of the particular region.

7. The method of claim 4, wherein determining the temperature of a particular region comprises determining a maximum temperature of the particular region.

8. The method of claim 1, further comprising:
    allocating wealth to the market agents; and
    generating the bids based in part on the wealth of the market agents.

9. The method of claim 8, wherein allocating the wealth to the market agents comprises allocating the wealth to the market agents as a function of a difficulty of temperature control in the regions associated with the market agents.

10. The method of claim 1, wherein generating the bids comprises generating buy bids, each buy bid representing a request for an increase in an amount of a particular thermal resource.

11. The method of claim 1, wherein generating the bids comprises generating offers to sell, each offer to sell representing a request for a decrease in an amount of a particular thermal resource.

12. The method of claim 1, further comprising:
    establishing prices for the thermal resources; and
    controlling the delivery of the sets of thermal resources to the regions based in part on the prices.

13. The method of claim 1, further comprising:
    conducting an auction to establish market prices for the thermal resources; and
    controlling the delivery of the sets of thermal resources to the regions based in part on the market prices.

14. The method of claim 13, wherein conducting the auction comprises:
    determining supply functions for the thermal resources;
    determining demand functions for the thermal resources; and
    establishing the market prices for the thermal resources as values at which the supply functions are substantially equal to the demand functions.

15. The method of claim 1, wherein controlling the sets of the thermal resources comprises adjusting setpoints of the thermal resources.

16. The method of claim 1, wherein associating the market agents with the regions comprises associating the market agents with processor racks in a data center.

17. A temperature control system, comprising:
    a sensing system configured to sense temperatures in a plurality of regions;
    a delivery system configured to deliver thermal resources to the plurality of regions; and
    a control system, coupled to the sensing system and the delivery system, comprising:
        market agents associated with the plurality of regions and configured to generate bids for thermal resources based in part on differences between measured temperatures and target temperatures of the regions; and
        an auctioneer configured to accept bids for the thermal resources from the market agents, assign control of sets of thermal resources to sets of market agents, and provide control signals to the delivery system for delivering the thermal resources to the plurality of regions, wherein the auctioneer is configured to assign control of a first set of thermal resources to a first set of market agents and assign control of a second set of thermal resources to a second set of market agents.

18. The system of claim 17, wherein the first set of thermal resources are primary resources affecting a majority of regions in the data center and the second set of thermal resources are secondary thermal resources affecting a minority of regions in the data center.

19. The system of claim 17, wherein the control system is configured to allocate wealth to the market agents based on a difficulty of temperature control in the regions associated with the respective market agents and the market agents are configured to generate bids based in part on the allocated wealth.

20. The system of claim 17, wherein the control system is further configured to establish prices for the thermal resources based on costs of the thermal resources.

21. The system of claim 17, wherein the control system is further configured to establish prices for the thermal resources based on market equilibrium prices determined using an auction.

22. The system of claim 17, wherein each market agent is associated with one or more processor racks in a data center.

23. A computer-readable medium configured with instructions for causing one or more computers to perform a method for cooling an area, the method comprising:
associating market agents with regions of the area;
generating bids for the thermal resources using the market agents;
assigning a first set of the market agents to control primary thermal resources, the primary thermal resources affecting a majority of the regions;
assigning a second set of the market agents to control secondary thermal resources, the secondary thermal resources affecting a minority of the regions;
controlling delivery of the sets of the thermal resources to the regions using the sets of the market agents.

24. The computer readable medium of claim 23, wherein generating the bids for the thermal resources comprises:
determining temperatures of the regions;
comparing the region temperatures with target temperatures; and
generating the bids based on differences between the region temperatures and the target temperatures.

25. A thermal control system, comprising:
means for associating market agents with regions of an area;
means for generating bids for thermal resources available in the regions using the market agents;
means for assigning a first set of market agents to control primary thermal resources, the primary thermal resources affecting a majority of the regions;
means for assigning a second set of market agents to control secondary thermal resources, the secondary thermal resources affecting a minority of the regions; and
means for controlling the delivery of the sets of thermal resources to the regions using the sets of market agents.

26. A method for temperature control, comprising:
generating bids, using market agents, for a plurality of thermal resources supplied to an area, at least one thermal resource having an attribute distinct from another thermal resource;
allocating control of the at least one thermal resource to a first set of market agents based on the bids; and
allocating control of each thermal resource other than the at least one thermal resource to a second set of market agents based on the bids.

27. The method of claim 26, further comprising associating the market agents with regions of the area.

28. The method of claim 26, further comprising associating the market agents with processor racks in a data center.

29. The method of claim 26, wherein the at least one thermal resource having the distinct attribute comprises air temperature.

30. The method of claim 26, wherein the at least one thermal resource having the distinct attribute comprises air flow rate.

31. The method of claim 26, wherein the at least one thermal resource having the distinct attribute comprises air flow direction.

32. The method of claim 26, wherein:
allocating control of the at least one thermal resource to the first set of market agents comprises allocating control of a primary thermal resource to the first set of market agents, the primary thermal resource affecting a majority of the regions; and
allocating control of another thermal resource to the second set of market agents comprises allocating control of a secondary thermal resource to the second set of market agents, the secondary thermal resource affecting a minority of the regions.

33. The method of claim 32, wherein allocating control of the primary thermal resource to the first set of market agents comprises allocating control of air temperature to the first set of market agents.

34. The method of claim 32, wherein allocating control of the primary thermal resource to the first set of market agents comprises allocating control of air flow rate to the first set of market agents.

35. The method of claim 32, wherein allocating control of the secondary thermal resource to the second set of market agents comprises allocating control of air flow direction to the second set of market agents.

36. The method of claim 26, wherein generating the bids for the thermal resources comprises:
determining temperatures of regions of the area;
comparing the region temperatures with target temperatures; and
generating the bids based in part on differences between the region temperatures and the target temperatures.

37. A temperature control system, comprising:
a sensing system configured to sense temperatures in an area;
a delivery system configured to deliver a plurality of thermal resources to the area, at least one thermal resource having an attribute distinct from other thermal resources; and
a control system, coupled to the sensing system and the delivery system, comprising:
market agents configured to generate bids for the thermal resources based in part on differences between measured temperatures and target temperatures in the area; and
an auctioneer configured to allocate control of the at least one thermal resource to a first set of market agents based on the bids and to allocate control of each thermal resource other than the at least one thermal resource to a second set of market agent based on the bids.

38. The system of claim 37, wherein the market agents are associated with regions of the area.

39. The system of claim 37, wherein the market agents are associated with processor racks in a data center.

40. The system of claim 37, wherein the at least one thermal resource having the distinct attribute comprises air temperature.

41. The system of claim 37, wherein the at least one thermal resource having the distinct attribute comprises air flow rate.

42. The system of claim 37, wherein the at least one thermal resource having the distinct attribute comprises air flow direction.

43. The system of claim 37, wherein the at least one thermal resource having the distinct attribute comprises a primary resource affecting a majority of the area.

44. The system of claim 37, wherein the at least one thermal resource having the distinct attribute comprises a secondary thermal resource affecting a minority of the area.

45. The system of claim 37, wherein the auctioneer is configured to allocate control of a primary thermal resource to the first set of market agents, the primary thermal resource affecting a majority of the regions and to allocate control of a secondary thermal resource to the second set of market agents, the secondary thermal resource affecting a minority of the regions.

46. The system of claim 45, wherein the auctioneer is configured to allocate control of air temperature and air flow rate to the first set of market agents and to allocate control of air flow direction to the second set of market agents.

47. The system of claim 37, wherein each market agent is configured to determine a temperature of a region of the area, compare the region temperature with a target temperature and generate a bid based in part on a difference between the region temperature and the target temperature.

48. A program storage medium, comprising:
a processor-readable device configured with instructions for controlling allocation of thermal resources, wherein execution of the instructions by one or more processors causes the one or more processors to perform operations including,
generating bids, using market agents, for a plurality of thermal resources supplied to an area, at least one thermal resource having an attribute distinct from another thermal resource;
allocating control of the at least one thermal resource to a first set of market agents based on the bids; and
allocating control of each thermal resource other than the at least one thermal resource to a second set of market agents based on the bids.

49. The program storage medium of claim 48, wherein execution of the instructions by one or more processors causes the one or more processors to perform operations including associating the market agents with regions of the area.

50. The program storage medium of claim 48, wherein execution of the instructions by one or more processors causes the one or more processors to perform operations including associating the market agents with processor racks in a data center.

51. The program storage medium of claim 48, wherein:
allocating control of the at least one thermal resource to the first set of market agents comprises allocating control of a primary thermal resource to the first set of market agents, the primary thermal resource affecting a majority of the regions; and
allocating control of another thermal resource to the second set of market agents comprises allocating control of a secondary thermal resource to the second set of market agents, the secondary thermal resource affecting a minority of the regions.

52. The program storage medium of claim 48, wherein generating the bids for the thermal resources comprises:
determining temperatures of regions of the area;
comparing the region temperatures with target temperatures; and
generating the bids based in part on differences between the region temperatures and the target temperatures.

53. A temperature control system, comprising:
means for generating bids, using market agents, for a plurality of thermal resources supplied to an area, at least one thermal resource having an attribute distinct from another thermal resource;
means for allocating control of the at least one thermal resource to a first set of market agents based on the bids; and
means for allocating control of each thermal resource other than the at least one thermal resource to a second set of market agents based on the bids.

54. The system of claim 53, further comprising means for associating the market agent with regions of the area.

55. The system of claim 53, further comprising means for associating the market agents with processor racks in a data center.

56. The system of claim 53, further comprising
means for allocating control of a primary thermal resource to the first set of market agents, the primary thermal resource affecting a majority of the regions; and
means for allocating control of a secondary thermal resource to the second set of market agents, the secondary thermal resource affecting a minority of the regions.

* * * * *